(12) United States Patent
Gao et al.

(10) Patent No.: US 11,740,867 B2
(45) Date of Patent: Aug. 29, 2023

(54) DATA SORTING METHOD, APPARATUS AND DEVICE, STORAGE MEDIUM AND PROGRAM PRODUCT

(71) Applicant: Microfun Co., Ltd, Beijing (CN)

(72) Inventors: Chi Gao, Beijing (CN); Wei Qi, Beijing (CN)

(73) Assignee: Microfun Co., Ltd, Beijing (CN)

( * ) Notice: Subject to any disclaimer, the term of this patent is extended or adjusted under 35 U.S.C. 154(b) by 285 days.

(21) Appl. No.: 17/375,366

(22) Filed: Jul. 14, 2021

(65) Prior Publication Data

US 2022/0357917 A1 Nov. 10, 2022

(30) Foreign Application Priority Data

May 7, 2021 (CN) .......................... 202110496458.0

(51) Int. Cl.
*G06F 16/90* (2019.01)
*G06F 7/24* (2006.01)
*G06F 16/901* (2019.01)
*G06F 8/65* (2018.01)

(52) U.S. Cl.
CPC .................. *G06F 7/24* (2013.01); *G06F 8/65* (2013.01); *G06F 16/9024* (2019.01)

(58) Field of Classification Search
None
See application file for complete search history.

(56) References Cited

U.S. PATENT DOCUMENTS

| | | | |
|---|---|---|---|
| 5,950,191 A * | 9/1999 | Schwartz | G06F 16/9024 707/E17.011 |
| 2005/0102294 A1* | 5/2005 | Coldewey | G06F 8/4442 |
| 2013/0182700 A1* | 7/2013 | Figura | H04L 41/5009 709/224 |
| 2020/0320036 A1 | 10/2020 | Golander et al. | |
| 2021/0103394 A1* | 4/2021 | Rho | G06F 3/0652 |

FOREIGN PATENT DOCUMENTS

CN 106528817 A 3/2017

OTHER PUBLICATIONS

Frauke Liers, Basic Introduction into Algorithms and Data Structures, Aug. 15, 2011, Computer Science Department University of Cologne, (Oldenburg, Germany) (Year: 2011).*
"Maximum heap (create, delete, insert and heap sort)", Publisher: Brief Book, Date: May 8, 2017.

* cited by examiner

*Primary Examiner* — Belix M Ortiz Ditren
(74) *Attorney, Agent, or Firm* — Maier & Maier, PLLC

(57) ABSTRACT

A data sorting method, apparatus and device, a storage medium, and a program product. The method includes: obtaining a data sorting and updating request, where the data sorting and updating request includes data to be updated and an update type; determining a current cursor node, according to the data sorting and updating request, from a circular doubly linked list corresponding to a binary heap storing original data and according to pointing of the current cursor node pointer; determining a node to be updated corresponding to the data to be updated in the binary heap according to the update type and the current cursor node; and performing updating and sorting operations on the original data according to the node to be updated and the data to be updated.

20 Claims, 5 Drawing Sheets

DATA SORTING METHOD, APPARATUS AND DEVICE, STORAGE MEDIUM AND PROGRAM PRODUCT

CROSS-REFERENCE TO RELATED APPLICATION

This application claims priority to Chinese Patent Application No. 202110496458.0, filed on May 7, 2021, which is hereby incorporated by reference in its entirety.

TECHNICAL FIELD

Embodiments of the present application relate to the technical field of data sorting, and in particular, to a data sorting method, apparatus and device, a storage medium and a program product.

BACKGROUND

Binary Heap is a data structure based on a binary tree, which is widely used to select the largest or smallest N data and a priority queue from a large amount of data, that is, to implement data sorting.

In the prior art, a data sorting method of a binary heap based on a pointer chain is applied to implement a priority queue such as a timer queue. When adding or deleting data to be updated into or from original data, the tail node should be located. The process of locating the tail node needs to be done step by step from the root node to the tail node according to child node pointers of respective nodes in the binary heap.

However, the above-mentioned existing method has high time complexity of locating the tail node, resulting in high time complexity of performing an adding or deleting operation of the data to be updated, that is, the time complexity of performing updating and sorting operations on the original data is high.

SUMMARY

Embodiments of the present application provide a data sorting method, apparatus and device, a storage medium, and a program product, to solve the problem that high time complexity of locating a tail node in the existing data sorting method of a binary heap based on a pointer chain leads to high time complexity of performing the adding or deleting operation of data to be updated.

In a first aspect, an embodiment of the present application provides a data sorting method, and the method includes:

obtaining a data sorting and updating request, where the data sorting and updating request includes: data to be updated and an update type;

determining a current cursor node according to the data sorting and updating request, from a circular doubly linked list corresponding to a binary heap storing original data and according to pointing of a current cursor node pointer, where the current cursor node is a first leaf node or a half node in the binary heap, the binary heap is a binary heap having a root node at a top level and a leaf node at a lower level, and the first leaf node is an upmost and leftmost leaf node, and the half node is a node with only a left child node;

determining a node to be updated corresponding to the data to be updated in the binary heap according to the update type and the current cursor node;

performing updating and sorting operations on the original data according to the node to be updated and the data to be updated.

In a possible implementation manner, the determining a node to be updated corresponding to the data to be updated in the binary heap according to the update type and the current cursor node includes:

if the update type is determined to be an adding data type, determining the node to be updated corresponding to the data to be updated to be a child node to be added of the current cursor node;

if the update type is determined to be a deleting data type, determining the node to be updated corresponding to the data to be updated to be a tail node, and determining a node to be deleted corresponding to the data to be updated.

In a possible implementation manner, if the node to be updated is determined to be a child node to be added of the cursor node, then the performing updating and sorting operations on the original data according to the node to be updated and the data to be updated includes:

adding a child node to the cursor node as the node to be updated, and adding the data to be updated to the node to be updated to complete the updating operation on the original data;

determining, according to the data to be updated in the node to be updated and data in a parent node corresponding to the node to be updated, whether an exchange operation needs to be performed on the node to be updated and the parent node corresponding to the node to be updated, if so, then performing the exchange operation on the parent node corresponding to the node to be updated and the node to be updated to complete the sorting operation on the original data.

In a possible implementation manner, if the node to be updated is determined to be the tail node, then the performing updating and sorting operations on the original data according to the node to be updated and the data to be updated includes:

deleting the tail node to complete the updating operation on the original data;

replace the node to be deleted with the tail node as a new node;

determining, according to data in the new node and data in a child node corresponding to the node to be deleted, whether an exchange operation needs to be performed on the new node and the child node corresponding to the node to be deleted, if so, then performing the exchange operation on the new node and the child node corresponding to the node to be deleted to complete the sorting operation on the original data.

In a possible implementation manner, the circular doubly linked list includes a cursor node and a leaf node which is not the cursor node in the binary heap, and a current pointing relationship corresponding to the cursor node and the leaf node which is not the cursor node in the binary heap;

after the performing updating and sorting operations on the original data according to the node to be updated and the data to be updated, the method further includes:

updating the current cursor node and the current pointing relationship according to the update type and a type of the current cursor node.

In a possible implementation manner, nodes of the binary heap are arranged from left to right and from top to bottom to form a node sequence;

the current pointing relationship corresponding to the cursor node and the leaf node which is not the cursor node in the binary heap specifically includes:

a left node pointer of a leaf node which is neither the cursor node nor the tail node points to a previous node of the leaf node, a right node pointer of the leaf node points to a next node of the leaf node, and a left node pointer of the cursor node points to the tail node, a right node pointer of the cursor node points to a next node of the cursor node, a left node pointer of the tail node points to a previous node of the tail node, and a right node pointer of the tail node points to the cursor node.

In a possible implementation manner, if the update type is the adding data type, and the type of the current cursor node type is the first leaf node, then updating the current cursor node and the current pointing relationship according to the update type and the type of the current cursor node includes:

updating a left node pointer of the node to be updated to point to a previous node of the node to be updated, updating a right node pointer of the node to be updated to point to the current cursor node, updating a right node pointer of the previous node of the node to be updated to point to the node to be updated, updating the left node pointer of the current cursor node to point to the node to be updated, and maintaining pointing of the current cursor node pointer unchanged.

In a possible implementation manner, if the update type is the adding data type and the type of the current cursor node is the half node, then updating the current cursor node and the current pointing relationship according to the update type and the type of the current cursor node includes:

updating a left node pointer of the node to be updated to point to a previous node of the node to be updated, updating a right node pointer of the node to be updated to point to a next node of the current cursor node, updating a right node pointer of the previous node of the node to be updated to point to the node to be updated, updating a right node pointer of the current cursor node to point to the node to be updated, updating the current cursor node to be the next node of the current cursor node, and updating a left node pointer of the updated current cursor node to point to the node to be updated.

In a possible implementation manner, if the update type is the deleting data type, and the type of the current cursor node is the first leaf node, then updating the current cursor node and the current pointing relationship according to the update type and the type of the current cursor node includes:

updating a right node pointer of a previous node of the current cursor node to point to the current cursor node, updating the left node pointer of the current cursor node to point to the previous node of the current cursor node, updating the current cursor node to be the previous node of the current cursor node, and updating a right node pointer of a previous node of the node to be updated to point to the updated current cursor node.

In a possible implementation manner, if the update type is the deleting data type and the type of the current cursor node is the half node, then updating the current cursor node and the current pointing relationship according to the update type and the type of the current cursor node includes:

updating a left node pointer of the current cursor node to point to a previous node of the node to be updated, and updating a right node pointer of a previous node of the node to be updated to point to the current cursor node, and maintaining pointing of the current cursor node pointer unchanged.

In a second aspect, an embodiment of the present application provides a data sorting apparatus, including:

an obtaining module, configured to obtain a data sorting and updating request, where the data sorting and updating request includes: data to be updated and an update type;

a first determining module, configured to determine a current cursor node according to the data sorting and updating request, from a circular doubly linked list corresponding to a binary heap storing original data and according to pointing of a current cursor node pointer, where the current cursor node is a first leaf node or a half node in a binary heap, the binary heap is a binary heap having a root node at a top level and a leaf node at a lower level, and the first leaf node is a upmost and leftmost leaf node, and the half node is a node with only a left child node;

a second determining module, configured to determine a node to be updated corresponding to the data to be updated in the binary heap according to the update type and the current cursor node;

an executing module, configured to perform updating and sorting operations on the original data according to the node to be updated and the data to be updated.

In a third aspect, an embodiment of the present application provides a data sorting device, including: a memory and at least one processor;

the memory stores computer-executable instructions;

the at least one processor executes the computer-executable instructions stored in the memory, to cause the at least one processor to execute the data sorting method according to any item of the first aspect.

In a fourth aspect, an embodiment of the present application provides a computer-readable storage medium, the computer-readable storage medium stores computer-executable instructions, and when a processor executes the computer-executable instructions, the method according to any item of the first aspect is implemented.

In a fifth aspect, an embodiment of the present application provides a computer program product, including a computer program, which when executed by a processor, implements the method according to any item of the first aspect.

According to the data sorting method, apparatus and device, the storage medium and the program product provided by the embodiments of the present application, the data sorting and updating request is obtained which includes the data to be updated and the update type, a current cursor node is determined according to the data sorting and updating request, from a circular doubly linked list corresponding to a binary heap storing original data and according to the pointing of the current cursor node pointer, a node to be updated corresponding to the data to be updated in the binary heap is determined according to the update type and the current cursor node, and updating and sorting operations are performed on the original data according to the node to be updated and the data to be updated, and thus, the rapid locating of the cursor node can be realized through the circular doubly linked list, thereby achieving rapid locating of the node to be updated, and reducing the time complexity of performing the updating and sorting operations on the original data.

BRIEF DESCRIPTION OF THE DRAWINGS

In order to explain the technical solutions of the embodiments of the present application or the prior art more clearly, the following will briefly introduce the drawings that need to be used in the description of the embodiments or the prior art. Obviously, the drawings in the following description are some embodiments of the present application, and for those

DETAILED DESCRIPTION OF THE EMBODIMENTS

Figure 1:
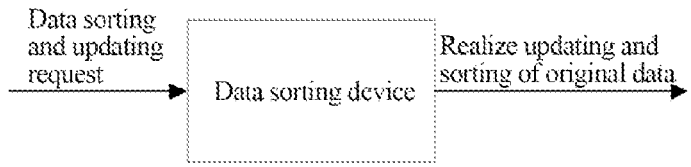
FIG. 1 is a schematic diagram of an application scenario provided by an embodiment of the present application.

In order to make the objectives, technical solutions, and advantages of the embodiments of the present application clearer, the technical solutions in the embodiments of the present application will be described clearly and completely in conjunction with the accompanying drawings in the embodiments of the present application. Obviously, the described embodiments are part of the embodiments of the present application, but not all of the embodiments. Based on the embodiments of the present application, all other embodiments obtained by those of ordinary skill in the art without creative work shall fall within the protection scope of the present application.

As a data structure based on a binary tree, a binary heap is a complete binary tree or a nearly complete binary tree. It is widely used to select the largest or smallest N data and a priority queue from a large amount of data, that is, to implement data sorting. The implementation of the binary heap is usually based on a pointer chain. In this method, the root node can usually be located directly according to the root node pointer, and the other nodes of the binary heap are located step by step from the root node to respective nodes according to child node pointers of respective nodes.

The data sorting method of the binary heap based on the pointer chain is applied to implement a priority queue. For example, when implementing a timer queue, the tail node should be located when adding or deleting the data to be updated, and a usual operation of locating the tail node is to locate step by step from the root node to the tail node according to the child node pointers of respective nodes in the binary heap. The time complexity of this process is O(log 2N), where N is the number of nodes in the binary heap. However, in the above-mentioned existing method, the time complexity of locating the tail node is high, which leads to high time complexity of performing an adding or deleting operation on the data to be updated, that is, it takes a long time.

In order to solve the above problem, in an embodiment of the present application, a pointer is set to directly point to the current cursor node, where the current cursor node is defined to be the first leaf node or a half node in a binary heap, and a circular doubly linked list is established based on a cursor node and a leaf node which is not the cursor node in the binary heap, which also includes a current pointing relationship corresponding to the cursor node and the leaf node which is not the cursor node, and a data sorting and updating request is obtained which includes data to be updated and an update type, a current cursor node is determined according to the data sorting and updating request, from the circular doubly linked list corresponding to the binary heap storing original data and according to the pointing of the current cursor node pointer, a node to be updated corresponding to the data to be updated in the binary heap is determined according to the update type and the current cursor node, and updating and sorting operations are performed on the original data according to the node to be updated and the data to be updated, and thus the current cursor node can be updated based on the current pointing relationship in the circular doubly linked list, and the rapid positioning of the cursor node can be realized, thereby realizing rapid locating of the node to be updated and reducing the time complexity of performing the updating and sorting operations on the original data.

FIG. 1 is a schematic diagram of an application scenario provided by an embodiment of the present application. As illustrated in FIG. 1, the solution provided by the embodiment of the present application can be applied to a data sorting device. The device obtains a data sorting and updating request, and performs processing operations on a binary heap which stores original data and which is stored in the sorting device, and finally realizes updating and sorting of the original data.

Figure 2:
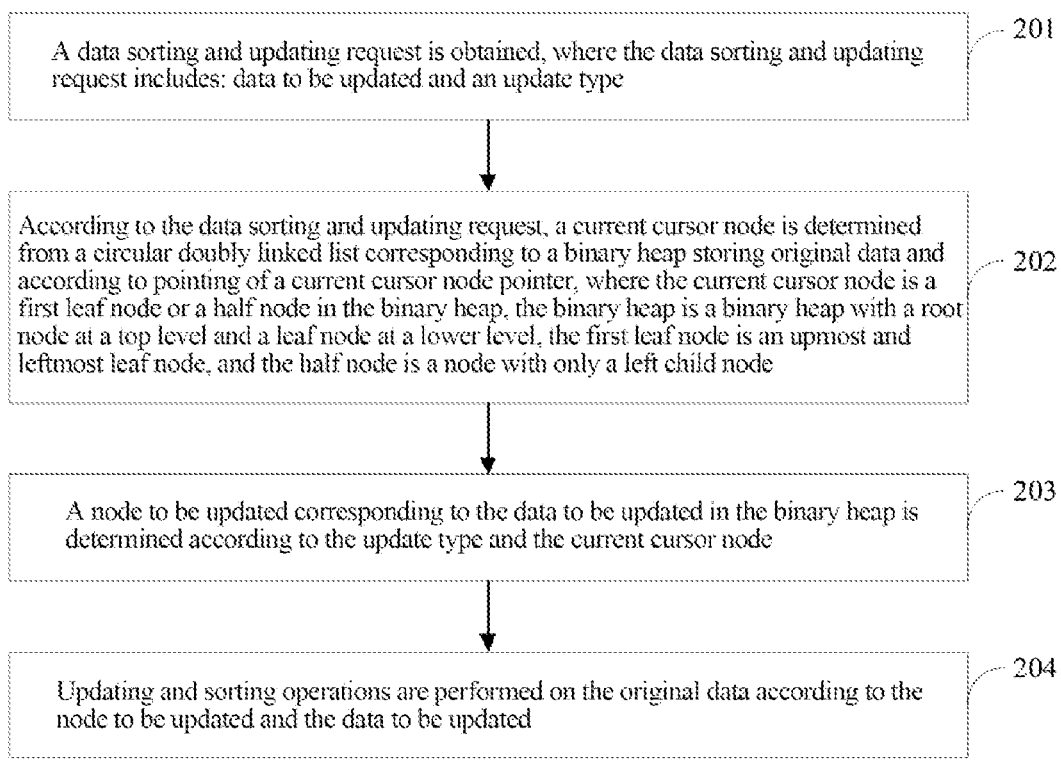
FIG. 2 is a schematic flowchart of a data sorting method provided by an embodiment of the present application.

FIG. 2 is a schematic flowchart of a data sorting method provided by an embodiment of the present application. The executive entity of the method in the embodiment of the present application may be a data sorting device. As illustrated in FIG. 2, the method in this embodiment may include:

Step 201: a data sorting and updating request is obtained, where the data sorting and updating request includes: data to be updated and an update type.

In this embodiment, the update type may be an adding data type or a deleting data type. The data to be updated corresponds to the update type. If the update type is the adding data type, the data to be updated is data to be added, and if the update type is the deleting data type, the data to be updated is data to be deleted. Correspondingly, the update of the adding data type is to add the data to be added to the binary heap storing the original data, and the update of the deleting data type is to delete the data to be deleted from the binary heap storing the original data.

Step 202: according to the data sorting and updating request, a current cursor node is determined from a circular doubly linked list corresponding to the binary heap storing original data and according to pointing of a current cursor node pointer, where the current cursor node is a first leaf node or a half node in the binary heap, the binary heap is a binary heap with a root node at a top level and a leaf node at a lower level, the first leaf node is an upmost and leftmost leaf node, and the half node is a node with only a left child node.

In this embodiment, the current cursor node is the first leaf node or a half node in the aforementioned binary heap, and the current cursor node pointer points to the current cursor node, and it points to an updated current cursor node as the current cursor node is updated, so that the current cursor node can be located within a period of time with a time complexity of O(1), which reduces the time complexity of locating the current cursor node.

Step 203: a node to be updated corresponding to the data to be updated in the binary heap is determined according to the update type and the current cursor node.

In this embodiment, it can be determined that the node to be updated is the next vacancy of the tail mode or is the tail node according to the update type being the adding data type or the deleting data type, and according to whether the current cursor node is a leaf node or a half node, it can be determined that the node to be updated is a left child node to be added or a right child node to be added of the current cursor node, or a right child node of a previous node of the current cursor node, or a left child node of the current cursor node.

Step 204: updating and sorting operations are performed on the original data according to the node to be updated and the data to be updated.

In this embodiment, the original data is updated, that is, the data to be added is added to the binary heap storing the original data, or the data to be deleted is deleted from the binary heap storing the original data. In order to maintain the binary heap's own attributes, that is, maintaining the attributes of a max heap or a min heap of the binary heap, after the original data is updated, a sorting operation needs to be performed on the nodes in the binary heap, that is, the sorting operation is performed on the original data, and especially, the sorting operation is performed on the node to be updated and the child node or parent node of the node to be updated.

It should be noted that the above-mentioned binary heap is "placed forward", that is, the root node of the binary heap is at the top layer, and the leaf nodes are at lower layers. In addition, the binary heap may also be "placed sideways" and "placed reversely". For example, when the binary heap is "placed sideways", the root node of the binary heap may be on the far left and the leaf nodes on the right. When the binary heap is "placed reversely", the root node of the binary heap may be placed at the bottom, and the leaf nodes are placed above. When the binary heap is "placed sideways" or "placed reversely", the processing method for the binary heap is similar to the processing method when the binary heap is "placed forward". For the specific implementation process and principle, reference can be made to the embodiment where the binary heap is "placed forward", which will not be repeated here.

According to the data sorting method provided in this embodiment, a data sorting and updating request is obtained which includes the data to be updated and the update type, and the current cursor node is determined according to the data sorting and updating request, from the circular doubly linked list corresponding to the binary heap storing the original data and according to the pointing of the current cursor node pointer, and the node to be updated corresponding to the data to be updated in the binary heap is determined according to the update type and the current cursor node, and updating and sorting operations are performed on the original data according to the node to be updated and the data to be updated, and thus, rapid locating of the cursor node can be realized by establishing the circular doubly linked list, thereby realizing rapid locating of the node to be updated, and reducing the time complexity of performing the updating and sorting operations on the original data.

At the same time, the circular doubly linked list includes the cursor node and the leaf node which is not the cursor node in the binary heap, as well as the current pointing relationship corresponding to the cursor node and the leaf node which is not the cursor node. In order to ensure that the cursor node can be updated in time to ensure the rapid locating of the cursor node, in an embodiment, the cursor node and the current pointing relationship can also be updated. Specifically, after the updating operation is performed on the original data according to the node to be updated and the data to be updated, it may also include: updating the current cursor node and the current pointing relationship according to the update type and the type of the current cursor node.

Specifically, the nodes of the binary heap are arranged from left to right and from top to bottom to form a node sequence; the pointing relationship corresponding to the cursor node and the leaf node which is not the cursor node in the binary heap specifically includes: the left node pointer of a leaf node which is neither a cursor node nor a tail node points to the previous node of the leaf node, the right node pointer of the leaf node points to the next node of the leaf node, the left node pointer of the cursor node points to the tail node, and the right node pointer of the cursor node points to the next node of the cursor node, the left node pointer of the tail node points to the previous node of the tail node, and the right node pointer of the tail node points to the cursor node.

In the data sorting method provided by this embodiment, after the updating operation on the original data is completed, the cursor node can be updated in time, and the current pointing relationship is updated, so as to ensure rapid locating of the cursor node, and meanwhile maintaining the correctness of the circular doubly linked list.

In order to realize the update of the cursor node in time to ensure that the cursor node can be rapidly located, an embodiment of the present application will further describe the update of the current cursor node and the update of the current pointing relationship for different update types and different types of current cursor node.

Figure 3:
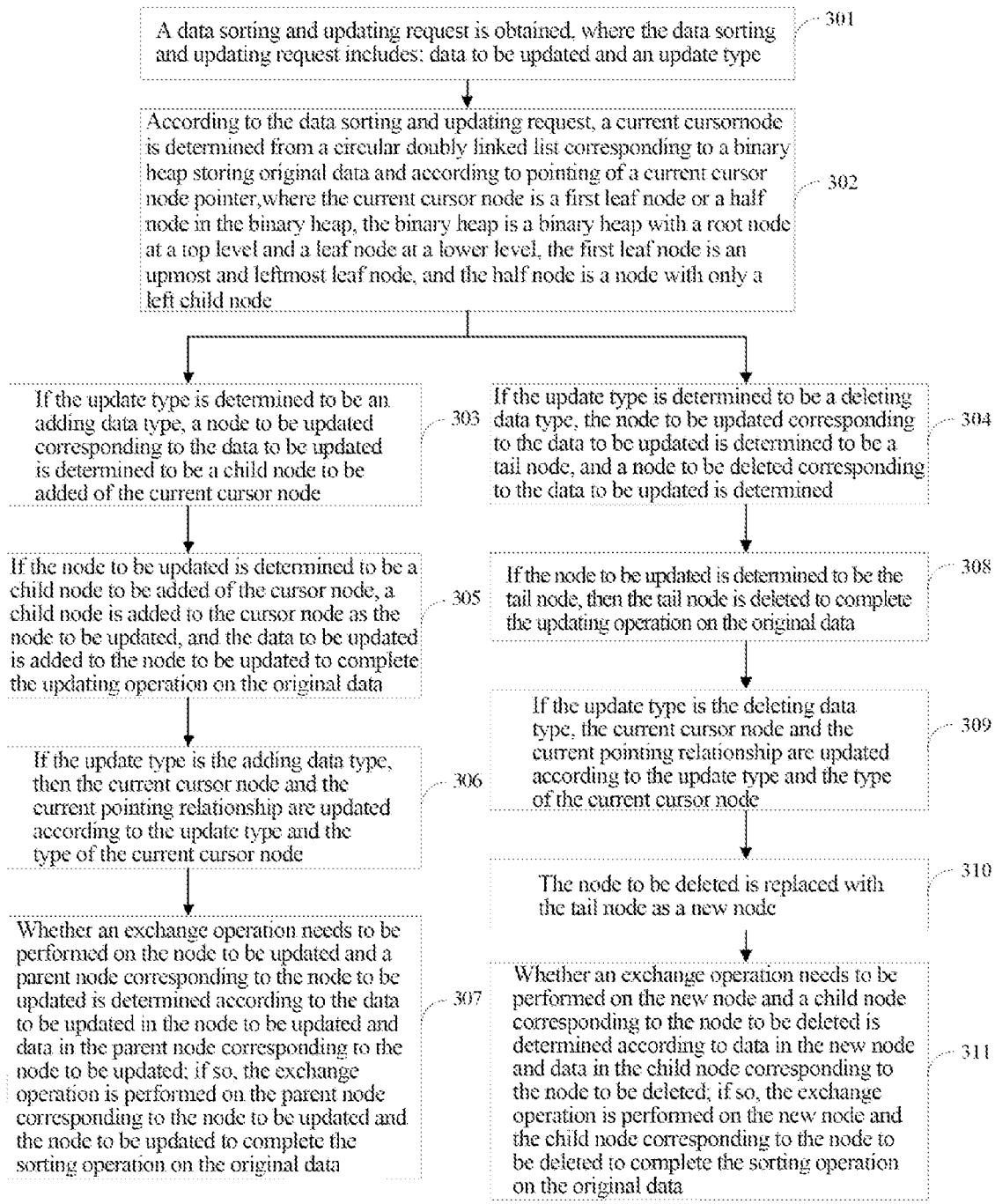
FIG. 3 is a schematic flowchart of another data sorting method provided by an embodiment of the present application.

FIG. 3 is a schematic flowchart of another data sorting method provided by an embodiment of the present application. As illustrated in FIG. 3, this embodiment is a detailed description of updating the current cursor node and the current pointing relationship on the basis of the technical solution provided by the foregoing embodiment. The method in this embodiment may include:

Step 301: a data sorting and updating request is obtained, where the data sorting and updating request includes: data to be updated and an update type.

Step 302: according to the data sorting and updating request, a current cursor node is determined from a circular doubly linked list corresponding to a binary heap storing original data and according to pointing of a current cursor node pointer, where the current cursor node is a first leaf node or a half node in the binary heap, the binary heap is a binary heap with a root node at a top level and a leaf node at a lower level, the first leaf node is an upmost and leftmost leaf node, and the half node is a node with only a left child node.

For the specific implementation process and principles of steps 301 to 302 in this embodiment, reference may be made to the foregoing embodiment, and the details are not described herein again.

Step 303: if the update type is determined to be an adding data type, a node to be updated corresponding to the data to be updated is determined to be a child node to be added of the current cursor node.

Step 304: if the update type is determined to be a deleting data type, the node to be updated corresponding to the data to be updated is determined to be a tail node, and a node to be deleted corresponding to the data to be updated is determined.

Steps 303-304 define the process of determining the node to be updated.

Specifically, when the update type is an adding data type, the node to be updated is the next vacancy of the tail node, and the next vacancy of the tail node is the child node to be added of the current cursor node, that is, when the current cursor node is the first leaf node, the current cursor node has no left child node, then the node to be updated is the left child node to be added of the current cursor node. When the current cursor node is a half node, the current cursor node has a left child node, then the node to be updated is the right child node to be added of the current cursor node.

In an embodiment, when the update type is the adding data type and the binary heap is empty, the node to be updated is the root node.

Further, when the update type is the deleting data type, the node to be updated is the tail node, that is, when the current cursor node is the first leaf node, the current cursor node has no left child node, then the node to be updated is the right child node of the previous node of the current cursor node, and when the current cursor node is a half node, the current cursor node has a left child node, then the node to be updated is the left child node of the current cursor node.

In an embodiment, when the update type is the deleting data type, and the binary heap has and only has a root node, the node to be updated is the aforementioned root node.

Specifically, when the update type is the deleting data type, the node to be deleted corresponding to the data to be updated is the node corresponding to the data to be updated in the binary heap.

Step 305: if the node to be updated is determined to be a child node to be added of the cursor node, a child node is added to the cursor node as the node to be updated, and the data to be updated is added to the node to be updated to complete an updating operation on the original data.

In this embodiment, if the node to be updated is a child node to be added of the cursor node, then the current update type is the adding data type, it is determined, according to the cursor node, to add a left child node or a right child node to the cursor node as the node to be updated, and the data to be updated is added to the above-mentioned node to be updated.

Step 306: if the update type is the adding data type, then the current cursor node and the current pointing relationship are updated according to the update type and the type of the current cursor node.

Figure 4:
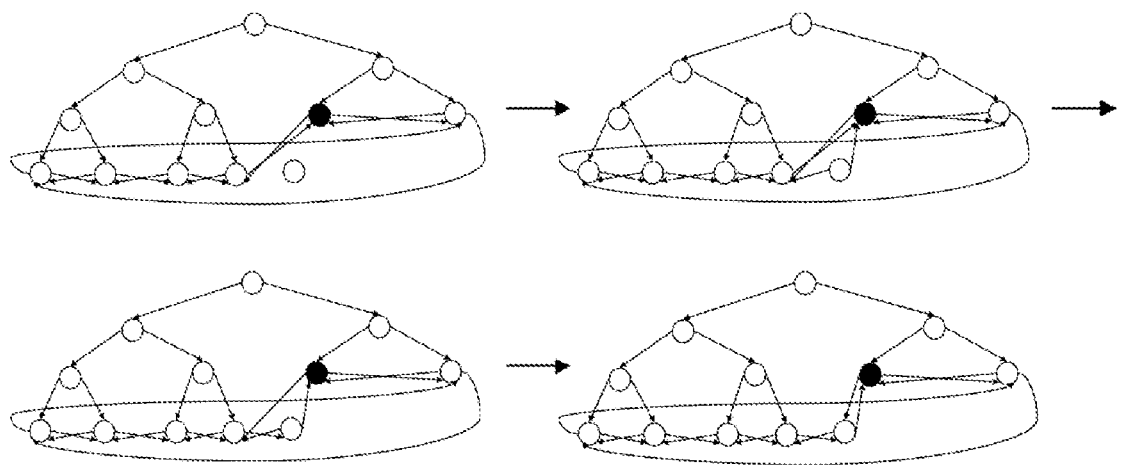
FIG. 4 is a schematic diagram of a process for updating a cursor node and a current pointing relationship provided by an embodiment of the present application.

In an embodiment, the step of updating the current cursor node and the current pointing relationship according to the update type and the type of the current cursor node is performed, which may specifically be: if the update type is the adding data type and the type of the current cursor node is the first leaf node, the left node pointer of the node to be updated is updated to point to the previous node of the node to be updated, the right node pointer of the node to be updated is updated to point to the current cursor node, and the right node pointer of the previous node of the node to be updated is updated to point to the node to be updated, the left node pointer of the current cursor node is updated to point to the node to be updated, and the pointing of the current cursor node pointer remains unchanged. In addition, the parent node pointer of the node to be updated points to the current cursor node. FIG. 4 is a schematic diagram of a process for updating a cursor node and a current pointing relationship provided by an embodiment of the present application. As illustrated in FIG. 4, the hollow circles represent the nodes in the binary heap, and the filled circles represent the current cursor node. To make the illustration clear, the parent node pointer of each node is not shown in FIG. 4.

Figure 5:
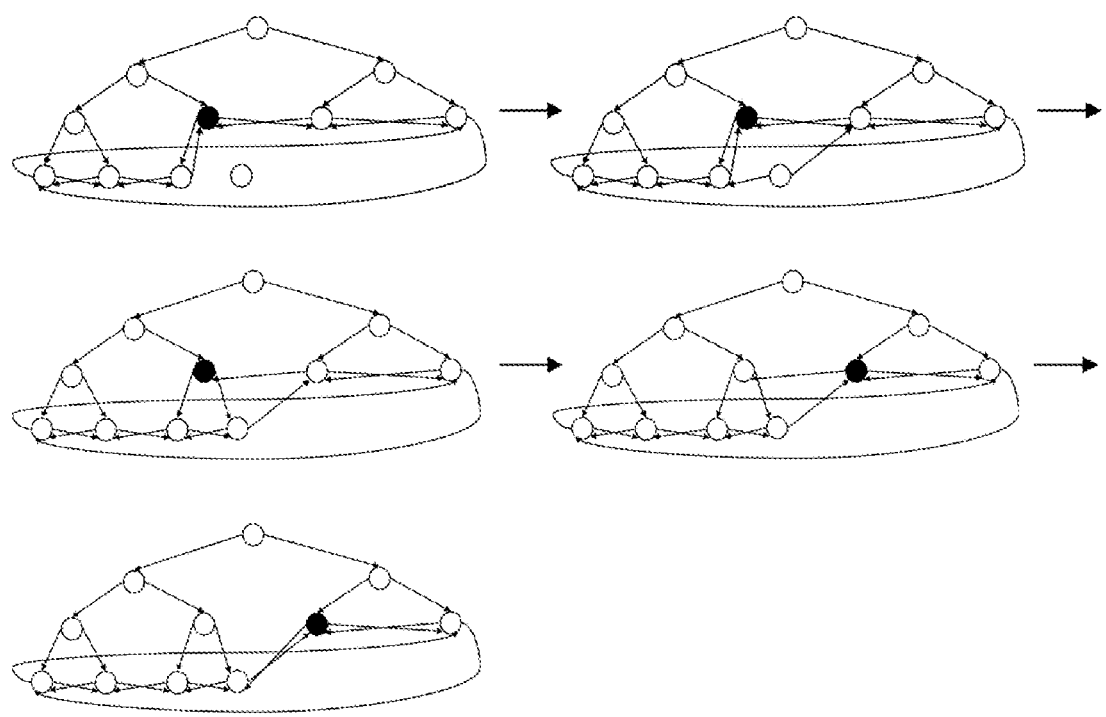
FIG. 5 is a schematic diagram of another process for updating the cursor node and the current pointing relationship provided by an embodiment of the present application.

Further, in an embodiment, the step of updating the current cursor node and the current pointing relationship according to the update type and the type of the current cursor node is performed, which may also specifically be: if the update type is the adding data type and the type of the current cursor node is the half node, the left node pointer of the node to be updated is updated to point to the previous node of the node to be updated, the right node pointer of the node to be updated is updated to point to the next node of the current cursor node, and the right node pointer of the previous node of the node to be updated is updated to point to the node to be updated, the right node pointer of the current cursor node is updated to point to the node to be updated, and the current cursor node pointer is updated to point to the next node of the current cursor node, that is, the current cursor node is updated to be the next node of the current cursor node, and the left node pointer of the updated current cursor node is updated to point to the node to be updated. In addition, the parent node pointer of the node to be updated is updated to point to the current cursor node before updated. FIG. 5 is a schematic diagram of another process for updating the cursor node and the current pointing relationship provided by an embodiment of the present application. As illustrated in FIG. 5, the hollow circles represent nodes in the binary heap, and the filled circles represent the current cursor node. To make the illustration clear, the parent node pointer of each node is not shown in FIG. 5.

In an embodiment, the step of updating the current cursor node and the current pointing relationship according to the update type and the type of the current cursor node is performed, which may also specifically be: if the update type is the adding data type and the binary heap is empty, then the node to be updated is the root node, and the current cursor node pointer is pointed to the node to be updated.

Step 307: whether an exchange operation needs to be performed on the node to be updated and a parent node corresponding to the node to be updated is determined according to the data to be updated in the node to be updated and data in the parent node corresponding to the node to be updated; if so, the exchange operation is performed on the parent node corresponding to the node to be updated and the node to be updated to complete the sorting operation on the original data.

In this embodiment, the data to be updated in the node to be updated is compared with the data in the parent node corresponding to the node to be updated to determine whether the exchange operation needs to be performed on the above nodes. For example, if the binary heap is a max heap, when the data to be updated in the node to be updated is greater than the data in the parent node corresponding to the node to be updated, the exchange operation needs to be performed on the parent node corresponding to the node to be updated and the node to be updated to complete the sorting operation on the original data.

Further, the exchange operation of the parent node corresponding to the node to be updated and the node to be updated may specifically include: the right node pointer of the node pointed to by the left node pointer of the node to be updated is pointed to a special value, for example, 0xFFFFFFFFFFFFFFFE, and the left node pointer of the node pointed to by the right node pointer of the node to be updated is pointed to the above-mentioned special value; the parent node pointer of the parent node corresponding to the node to be updated is updated to point to the node to be updated, and the parent node pointer corresponding to the node to be updated is updated to point to the parent node of the aforementioned parent node; if the pointers of the left child node, the right child node and the parent mode of the parent node corresponding to the node to be updated point to the parent node corresponding to the node to be updated, then the above pointers are pointed to the node to be updated; the left node pointer and the right node pointer of the node to be updated are updated to point to the same as the left node pointer and the right node pointer of the parent node corresponding to the node to be updated; the right node pointer of a node whose right node pointer points to the special value is pointed to the parent node corresponding to the node to be updated, and the left node pointer of a node whose left node pointer points to the special value is pointed to the parent node corresponding to the node to be updated.

Steps 305 to 307 define the process of performing updating and sorting operations on the original data when the node to be updated is a child node of the cursor node.

Step 308: if the node to be updated is determined to be the tail node, then the tail node is deleted to complete the updating operation on the original data.

In this embodiment, if the node to be updated is the tail node, then the current update type is the deleting data type. The tail node is determined to be the right child node of the previous node of the current cursor node or the left child node of the current cursor node according to the current cursor node. The data in the above tail node is temporarily stored in a temporary variable, and the tail node is deleted.

Step 309: if the update type is the deleting data type, then the current cursor node and the current pointing relationship are updated according to the update type and the type of the current cursor node.

Figure 6:
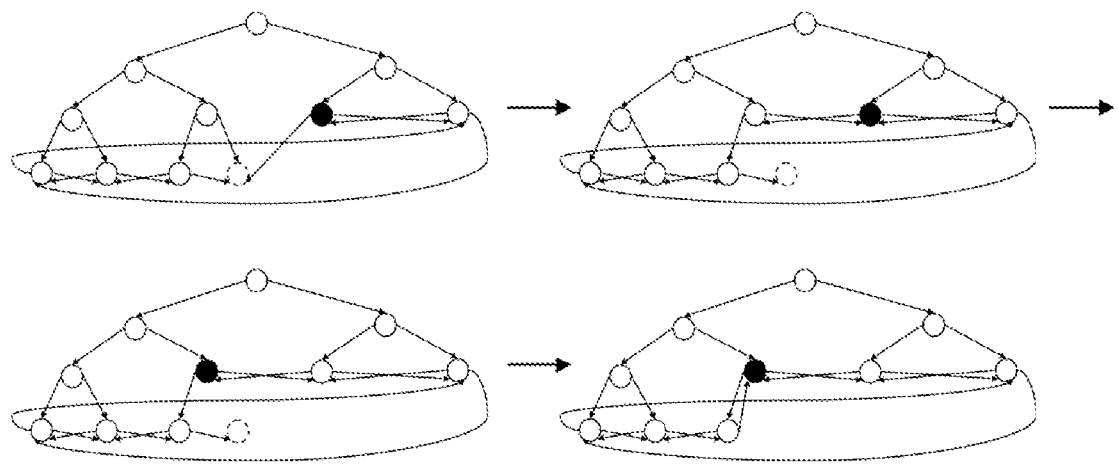
FIG. 6 is a schematic diagram of still another process for updating the cursor node and the current pointing relationship provided by an embodiment of the present application.

In an embodiment, the step of updating the current cursor node and the current pointing relationship according to the update type and the type of the current cursor node is performed which may specifically be: if the update type is the deleting data type and the type of the current cursor node is the first leaf node, then the right node pointer of the previous node of the current cursor node is updated to point to the current cursor node, and the left node pointer of the current cursor node is updated to point to the previous node of the current cursor node, the current cursor node pointer is updated to point to the previous node of the current cursor node, that is, the current cursor node is updated to be the previous node of the current cursor node, and the right node pointer of the previous node of the node to be updated is updated to point to the updated current cursor node. FIG. 6 is a schematic diagram of still another process for updating the cursor node and the current pointing relationship provided by an embodiment of the present application. As illustrated in FIG. 6, the hollow circles represent the nodes in the binary heap, the filled circles represent the current cursor node, and the dashed hollow circles represent the deleted node to be updated. To make the illustration clear, the parent node pointer of each node is not shown in FIG. 6.

It should be noted that since the previous node of the current cursor node cannot be directly determined through the current cursor node, the previous node of the current cursor node needs to be determined based on the circular doubly linked list. Specifically, the previous node of the current cursor node can be determined as follows: after the tail node is deleted, the left node pointer of the current cursor node points to a predecessor node of the current cursor node, and the parent node of the predecessor node can be determined according to the parent node pointer of the predecessor node, and that parent node is the previous node of the current cursor node.

Figure 7:
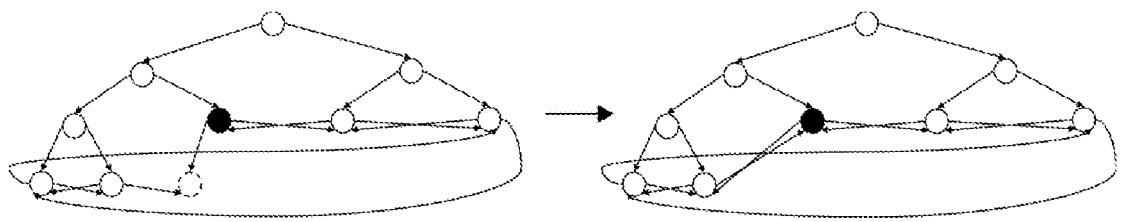
FIG. 7 is a schematic diagram of yet another process of updating the cursor node and the current pointing relationship provided by an embodiment of the present application.

Further, in an embodiment, the step of updating the current cursor node and the current pointing relationship according to the update type and the type of the current cursor node is performed which may also specifically be: if the update type is the deleting data type and the type of the current cursor node is the half node, the left node pointer of the current cursor node is updated to point to the previous node of the node to be updated, and the right node pointer of the previous node of the node to be updated is updated to point to the current cursor node, and the pointing of the current cursor node pointer remains unchanged. FIG. 7 is a schematic diagram of yet another process for updating the cursor node and the current pointing relationship provided by an embodiment of the present application. As illustrated in FIG. 7, the hollow circles represent the nodes in the binary heap, the filled circles represent the current cursor node, and the dashed hollow circles represent the deleted node to be updated. To make the illustration clear, the parent node pointer of each node is not shown in FIG. 7.

In an embodiment, the step of updating the current cursor node and the current pointing relationship according to the update type and the type of the current cursor node is performed which may also specifically be: if the update type is the deleting data type, and the binary heap has and only has a root node, then the current cursor node is the above-mentioned root node, and the node to be updated is the above-mentioned root node, and the root node pointer and the current cursor node pointer are cleared.

Step 310: the node to be deleted is replaced with the tail node as a new node.

In this embodiment, the data in the node to be deleted is replace with the data of the tail node temporarily stored in the temporary variable, that is, the node to be deleted is replaced with the tail node. If the pointers of the left child node, the right child node and the parent node of the node to be deleted point to the node to be deleted, the above pointers are pointed to the new node, and the left node pointer, the right node pointer and the parent node pointer of the new node are updated to respectively point to the same as the left node pointer, the right node pointer, and the parent node pointer of the node to be deleted.

Step 311: whether an exchange operation needs to be performed on the new node and a child node corresponding to the node to be deleted is determined according to data in the new node and data in the child node corresponding to the node to be deleted, and if so, the exchange operation is performed on the new node and the child node corresponding to the node to be deleted to complete the sorting operation on the original data.

In this embodiment, the data in the new node is compared with the data in the child node corresponding to the node to be deleted to determine whether the exchange operation needs to be performed on the above nodes. For example, if the binary heap is a max heap, when the data in the new node is smaller than the data in the child node corresponding to the node to be deleted, it is needed to perform an exchange operation on the new node and the child node corresponding to the node to be deleted to complete the sorting operation on the original data.

Further, performing the exchange operation on the new node and the child node corresponding to the node to be deleted may specifically include: the right node pointer of the node pointed to by the left node pointer of the child node corresponding to the node to be deleted is pointed to a special value, for example, 0xFFFFFFFFFFFFFFFE, the left node pointer of the node pointed to by the right node pointer of the child node corresponding to the node to be deleted is pointed to the above special value; the parent node pointer of the new node is updated to point to the child node corresponding to the node to be deleted, and the parent node pointer of the child node corresponding to the node to be deleted is updated to point to the parent node of the new node; if the pointers of the left child node, the right child node and the parent node of the new node point to the new node, then the pointers are pointed to the child node corresponding to the node to be deleted; the left node pointer and the right node pointer of the child node corresponding to the node to be deleted are updated to point to the same as the left node pointer and the right node pointer of the new node; the right node pointer of a node whose right node pointer points to the special value is pointed to the new node, and the left node pointer of a node whose left node pointer point to the special value is pointed to the new node.

It should be noted that if the child node corresponding to the node to be deleted is not a leaf node and not a half node, then its left node pointer points to its left child node, and its right node pointer points to its right child node. If the child node corresponding to the node to be deleted is a half node, then its left node pointer points to its left child node.

Steps 308 to 311 define the process of performing updating and sorting operations on the original data when the node to be updated is the tail node.

According to the data sorting method provided in this embodiment, the data sorting and updating request is obtained, and the current cursor node is determined according to the above-mentioned updating request, from the circular doubly linked list corresponding to the binary heap storing the original data and according to the pointing of the current cursor node pointer, and the node to be updated is determined according to the update type, and then updating and sorting operations are performed on the original data according to the node to be updated and the data to be updated; meanwhile, the current cursor node and the current pointing relationship are updated according to different update types and different types of current cursor node, and thus, the current cursor node can be updated in time, and the current pointing relationship can be updated, thereby ensuring the maintenance of the correctness of the circular doubly linked list and the rapid locating of the cursor node, and then realizing rapid locating of the node to be updated, and reducing the time complexity of performing the updating and sorting operations on the original data.

Figure 8:
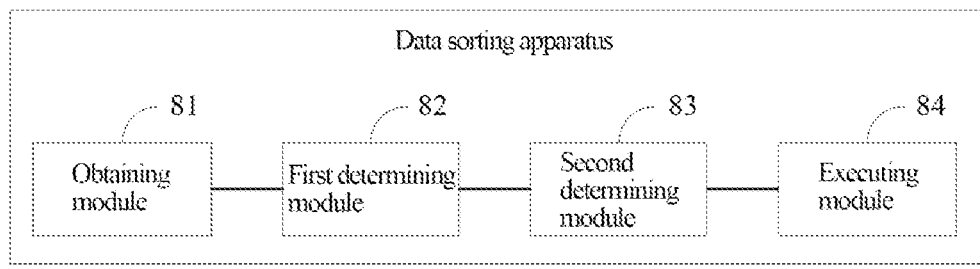
FIG. 8 is a schematic structural diagram of a data sorting apparatus provided by an embodiment of the present application.

FIG. 8 is a schematic structural diagram of a data sorting apparatus provided by an embodiment of the present application. As illustrated in FIG. 8, the data sorting apparatus provided in this embodiment may include: an obtaining module 81, a first determining module 82, a second determining module 83, and an executing module 84.

The obtaining module 81 is configured to obtain a data sorting and updating request, where the data sorting and updating request includes: data to be updated and an update type.

The first determining module 82 is configured to, according to the data sorting and updating request, determine a current cursor node from a circular doubly linked list corresponding to a binary heap storing original data and according to pointing of a current cursor node pointer, where the current cursor node is a first leaf node or a half node in the binary heap, the binary heap is a binary heap with a root node at a top level and a leaf node at a lower level, the first leaf node is a upmost and leftmost leaf node, and the half node is a node with only a left child node.

The second determining module 83 is configured to determine a node to be updated corresponding to the data to be updated in the binary heap according to the update type and the current cursor node;

The executing module 84 is configured to perform updating and sorting operations on the original data according to the node to be updated and the data to be updated.

In an optional implementation manner, the second determining module 83 is specifically configured to:

if the update type is determined to be an adding data type, determine the node to be updated corresponding to the data to be updated to be a child node to be added of the current cursor node;

if the update type is determined to be a deleting data type, determine the node to be updated corresponding to the data to be updated to be a tail node, and determine a node to be deleted corresponding to the data to be updated.

In an optional implementation manner, when the node to be updated is determined to be the child node to be added of the cursor node, the executing module 84 is specifically configured to:

add a child node to the cursor node as the node to be updated, and add the data to be updated to the node to be updated to complete the updating operation on the original data;

according to the data to be updated in the node to be updated and data in a parent node corresponding to the node to be updated, determine whether an exchanging operation needs to be performed on the node to be updated and the parent node corresponding to the node to be updated, if so, then perform the exchange operation on the parent node corresponding to the node to be updated and the node to be updated to complete the sorting operation on the original data.

In an optional implementation manner, when the node to be updated is determined to be the tail node, the executing module 84 is further specifically configured to:

delete the tail node to complete the updating operation on the original data;

replace the node to be deleted with the tail node as a new node;

according to data in the new node and data in a child node corresponding to the node to be deleted, determine whether an exchanging operation needs to be performed on the new node and the child node corresponding to the node to be deleted, if so, perform the exchange operation on the new node and the child node corresponding to the node to be deleted to complete the sorting operation on the original data.

In an optional implementation manner, after the updating operation is performed on the original data according to the node to be updated and the data to be updated, the executing module 84 is further configured to:

update the current cursor node and a current pointing relationship according to the update type and a type of the current cursor node.

In an optional implementation manner, when the update type is the adding data type, and the type of the current cursor node is the first leaf node, and then the current cursor node and the current pointing relationship are updated according to the update type and the type of the current cursor node, the executing module 84 is further configured to:

update a left node pointer of the node to be updated to point to a previous node of the node to be updated, update a right node pointer of the node to be updated to point to the current cursor node, update a right node pointer of the previous node of the node to be updated to point to the node to be updated, update a left node pointer of the current cursor node to point to the node to be updated, and maintain pointing of the current cursor node pointer unchanged.

In an optional implementation manner, when the update type is the adding data type, and the type of the current cursor node is the half node, and then the current cursor node and the current pointing relationship are updated according to the update type and the type of the current cursor node, the executing module 84 is also configured to:

update a left node pointer of the node to be updated to point to a previous node of the node to be updated, update a right node pointer of the node to be updated to point to a next node of the current cursor node, and update a right node pointer of the previous node of the node to be updated to point to the node to be updated, update a right node pointer of the current cursor node to point to the node to be updated, update the current cursor node to be the next node of the current cursor node, and update a left node pointer of the current cursor node updated to point to the node to be updated.

In an optional implementation manner, when the update type is the deleting data type, and the type of the current cursor node is the first leaf node, and then the current cursor node and the current pointing relationship are updated according to the update type and the type of the current cursor node, the executing module 84 is also configured to:

update a right node pointer of a previous node of the current cursor node to point to the current cursor node, update a left node pointer of the current cursor node to point to the previous node of the current cursor node, update the current cursor node to be the previous node of the current cursor node, update the right node pointer of the previous node of the node to be updated to point to the updated current cursor node.

In an optional implementation manner, when the update type is the deleting data type, and the type of the current cursor node is a half node, and then the current cursor node and the current pointing relationship are updated according to the update type and the type of the current cursor node, the executing module 84 is also configured to:

update a left node pointer of the current cursor node to point to a previous node of the node to be updated, update a right node pointer of the previous node of the node to be updated to point to the current cursor node, and maintain pointing of the current cursor node pointer unchanged.

The data sorting apparatus provided in this embodiment can execute the technical solutions of the foregoing method embodiments, and the implementation principles and the technical effects are similar, which will not be repeated herein.

Figure 9:
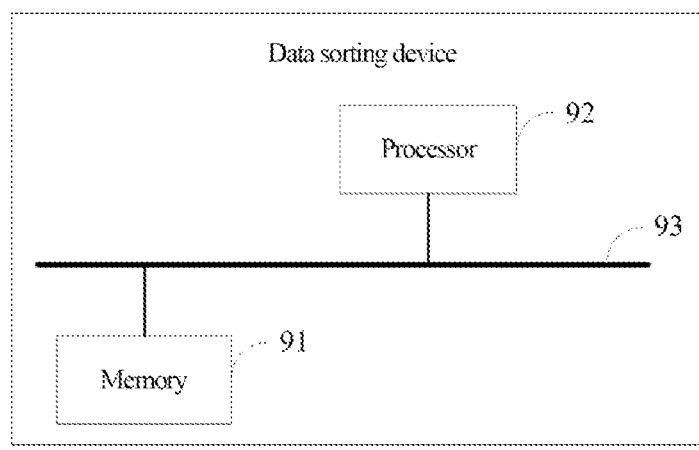
FIG. 9 is a schematic structural diagram of a data sorting device provided by an embodiment of the present application.

FIG. 9 is a schematic structural diagram of the data sorting device provided by an embodiment of the present application. As illustrated in FIG. 9, the data sorting device provided in this embodiment includes: a memory 91 and at least one processor 92;

the memory 91 stores computer-executable instructions;

the at least one processor 92 executes the computer-executable instructions stored in the memory 91, to cause the at least one processor 92 to execute the data sorting method according to any of the foregoing embodiments.

The memory 91 and the processor 92 may be connected through a bus 93.

For the specific implementation principles and effects of the data sorting device provided in this embodiment, reference may be made to the related descriptions and effects corresponding to the embodiments shown in FIG. 1 to FIG. 7, which will not be repeated herein.

An embodiment of the present application also provides a computer-readable storage medium, the computer-readable storage medium stores computer-executable instructions, and when a processor executes the computer-executable instructions, the method according to any of the above embodiments is implemented.

An embodiment of the present application also provides a computer program product, including a computer program, which when executed by a processor, implements the method according to any of the foregoing embodiments.

The computer-readable storage medium may be a ROM, a random-access memory (RAM), a CD-ROM, a magnetic tape, a floppy disk, an optical data storage device, etc.

Those skilled in the art will easily think of other embodiments of the present application after considering the description and practicing the application disclosed herein. The present application is intended to cover any variations, uses, or adaptive changes of the present application when these variations, uses, or adaptive changes follow the general principles of the present application and include common knowledge or conventional technical means in the technical field that are not disclosed by the present application. The description and the embodiments are merely regarded as illustrative, and the true scope and spirit of the present application are pointed out by the appended claims.

It should be understood that the present application is not limited to the precise structure that has been described above and shown in the drawings, and various modifications and changes may be made without departing from the scope thereof. The scope of the present application is merely limited by the appended claims.

What is claimed is:

1. A data sorting method, comprising:
obtaining a data sorting and updating request, wherein the data sorting and updating request comprises data to be updated and an update type;
determining a current cursor node according to the data sorting and updating request, from a circular doubly linked list corresponding to a binary heap storing original data and according to pointing of a current cursor node pointer, wherein the current cursor node is a first leaf node or a half node in a binary heap, the binary heap is a binary heap with a root node at a top level and a leaf node at a lower level, and the first leaf node is an upmost and leftmost leaf node, and the half node is a node with only a left child node;
determining a node to be updated corresponding to the data to be updated in the binary heap according to the update type and the current cursor node; and
performing updating and sorting operations on the original data according to the node to be updated and the data to be updated.

2. The method according to claim 1, wherein the determining a node to be updated corresponding to the data to be updated in the binary heap according to the update type and the current cursor node comprises:

if the update type is determined to be an adding data type, determining the node to be updated corresponding to the data to be updated to be a child node to be added of the current cursor node; and if the update type is determined to be a deleting data type, determining the node to be updated corresponding to the data to be updated to be a tail node, and determining a node to be deleted corresponding to the data to be updated.

3. The method according to claim 2, wherein if the node to be updated is determined to be a child node to be added of the cursor node, then the performing updating and sorting operations on the original data according to the node to be updated and the data to be updated comprises:

adding a child node to the cursor node as the node to be updated, and adding the data to be updated to the node to be updated to complete the updating operation on the original data; and determining, according to the data to be updated in the node to be updated and data in a parent node corresponding to the node to be updated, whether an exchange operation needs to be performed on the node to be updated and the parent node corresponding to the node to be updated, if so, then performing the exchange operation on the parent node corresponding to the node to be updated and the node to be updated to complete the sorting operation on the original data.

4. The method according to claim 2, wherein if the node to be updated is determined to be the tail node, then the performing updating and sorting operations on the original data according to the node to be updated and the data to be updated comprises:

deleting the tail node to complete the updating operation on the original data;

replacing the node to be deleted with the tail node as a new node; and determining, according to data in the new node and data in a child node corresponding to the node to be deleted, whether an exchange operation needs to be performed on the new node and the child node corresponding to the node to be deleted, if so, then performing the exchange operation on the new node and the child node corresponding to the node to be deleted to complete the sorting operation on the original data.

5. The method according to claim 1, wherein the circular doubly linked list comprises a cursor node and a leaf node which is not the cursor node in the binary heap, and a current pointing relationship corresponding to the cursor node and the leaf node which is not the cursor node in the binary heap; and after the performing updating and sorting operations on the original data according to the node to be updated and the data to be updated, the method further comprises:

updating the current cursor node and the current pointing relationship according to the update type and a type of the current cursor node.

6. The method according to claim 5, wherein nodes of the binary heap are arranged from left to right and from top to bottom to form a node sequence;

the current pointing relationship corresponding to the cursor node and the leaf node which is not the cursor node in the binary heap specifically comprises:

a left node pointer of a leaf node which is neither the cursor node nor the tail node points to a previous node of the leaf node, a right node pointer of the leaf node points to a next node of the leaf node, and a left node pointer of the cursor node points to the tail node, a right node pointer of the cursor node points to a next node of the cursor node, a left node pointer of the tail node points to a previous node of the tail node, and a right node pointer of the tail node points to the cursor node.

7. The method according to claim 6, wherein if the update type is an adding data type, and the type of the current cursor node is the first leaf node, then updating the current cursor node and the current pointing relationship according to the update type and the type of the current cursor node type comprises:

updating a left node pointer of the node to be updated to point to a previous node of the node to be updated, updating a right node pointer of the node to be updated to point to the current cursor node, updating a right node pointer of the previous node of the node to be updated to point to the node to be updated, updating the left node pointer of the current cursor node to point to the node to be updated, and maintaining pointing of the current cursor node pointer unchanged.

8. The method according to claim 6, wherein if the update type is an adding data type and the type of the current cursor node is the half node, then updating the current cursor node and the current pointing relationship according to the update type and the type of the current cursor node comprises:

updating a left node pointer of the node to be updated to point to a previous node of the node to be updated, updating a right node pointer of the node to be updated to point to a next node of the current cursor node, updating a right node pointer of the previous node of the node to be updated to point to the node to be updated, updating a right node pointer of the current cursor node to point to the node to be updated, updating the current cursor node to be the next node of the current cursor node, and updating the left node pointer of the updated current cursor node to point to the node to be updated.

9. The method according to claim 6, wherein if the update type is a deleting data type, and the type of the current cursor node is the first leaf node, then updating the current cursor node and the current pointing relationship according to the update type and the type of the current cursor node comprises:

updating a right node pointer of a previous node of the current cursor node to point to the current cursor node, updating a left node pointer of the current cursor node to point to the previous node of the current cursor node, updating the current cursor node to be the previous node of the current cursor node, and updating a right node pointer of a previous node of the node to be updated to point to the updated current cursor node.

10. The method according to claim 6, wherein if the update type is a deleting data type and the type of the current cursor node is the half node, then updating the current cursor node and the current pointing relationship according to the update type and the type of the current cursor node comprises:

updating a left node pointer of the current cursor node to point to a previous node of the node to be updated, updating a right node pointer of the previous node of the node to be updated to point to the current cursor node, and maintaining pointing of the current cursor node pointer unchanged.

11. A data sorting device, comprising: a memory and at least one processor; wherein:

the memory stores computer-executable instructions;

the at least one processor executes the computer-executable instructions stored in the memory, to cause the at least one processor to:

obtain a data sorting and updating request, wherein the data sorting and updating request comprises data to be updated and an update type;

determine a current cursor node, according to the data sorting and updating request, from a circular doubly linked list corresponding to a binary heap storing original data and according to pointing of a current cursor node pointer, wherein the current cursor node is a first leaf node or a half node in a binary heap, the binary heap is a binary heap with a root node at a top level and a leaf node at a lower level, and the first leaf node is an upmost and leftmost leaf node, and the half node is a node with only a left child node;

determine a node to be updated corresponding to the data to be updated in the binary heap according to the update type and the current cursor node; and perform updating and sorting operations on the original data according to the node to be updated and the data to be updated.

12. The device according to claim 11, wherein the processor is further caused to:

if the update type is determined to be an adding data type, determine the node to be updated corresponding to the data to be updated to be a child node to be added of the current cursor node; and if the update type is determined to be a deleting data type, determine the node to be updated corresponding to the data to be updated to be a tail node, and determining a node to be deleted corresponding to the data to be updated.

13. The device according to claim 12, wherein if the node to be updated is determined to be a child node to be added of the cursor node, then the processor is further caused to:

add a child node to the cursor node as the node to be updated, and add the data to be updated to the node to be updated to complete the updating operation on the original data; and determine, according to the data to be updated in the node to be updated and data in a parent node corresponding to the node to be updated, whether an exchange operation needs to be performed on the node to be updated and the parent node corresponding to the node to be updated, if so, then perform the exchange operation on the parent node corresponding to the node to be updated and the node to be updated to complete the sorting operation on the original data.

14. The device according to claim 12, wherein if the node to be updated is determined to be the tail node, then the processor is further caused to:

delete the tail node to complete the updating operation on the original data;

replace the node to be deleted with the tail node as a new node; and determine, according to data in the new node and data in a child node corresponding to the node to be deleted, whether an exchange operation needs to be performed on the new node and the child node corresponding to the node to be deleted, if so, then perform the exchange operation on the new node and the child node corresponding to the node to be deleted to complete the sorting operation on the original data.

15. The device according to claim 11, wherein the circular doubly linked list comprises a cursor node and a leaf node which is not the cursor node in the binary heap, and a current pointing relationship corresponding to the cursor node and the leaf node which is not the cursor node in the binary heap;

after the updating and sorting operation are performed on the original data according to the node to be updated and the data to be updated, the processor is further caused to:

update the current cursor node and the current pointing relationship according to the update type and a type of the current cursor node.

16. The device according to claim 15, wherein nodes of the binary heap are arranged from left to right and from top to bottom to form a node sequence; and the current pointing relationship corresponding to the cursor node and the leaf node which is not the cursor node in the binary heap specifically comprises:

a left node pointer of a leaf node which is neither the cursor node nor the tail node points to a previous node of the leaf node, a right node pointer of the leaf node points to a next node of the leaf node, and a left node pointer of the cursor node points to the tail node, a right node pointer of the cursor node points to a next node of the cursor node, a left node pointer of the tail node points to a previous node of the tail node, and a right node pointer of the tail node points to the cursor node.

17. The device according to claim 16, wherein if the update type is an adding data type, and the type of the current cursor node is the first leaf node, then the processor is further caused to:

update a left node pointer of the node to be updated to point to a previous node of the node to be updated, update a right node pointer of the node to be updated to point to the current cursor node, update a right node pointer of the previous node of the node to be updated to point to the node to be updated, update the left node pointer of the current cursor node to point to the node to be updated, and maintain pointing of the current cursor node pointer unchanged.

18. The device according to claim 16, wherein if the update type is an adding data type and the type of the current cursor node is the half node, then the processor is further caused to:

update a left node pointer of the node to be updated to point to a previous node of the node to be updated, update a right node pointer of the node to be updated to point to a next node of the current cursor node, update a right node pointer of the previous node of the node to be updated to point to the node to be updated, update a right node pointer of the current cursor node to point to the node to be updated, update the current cursor node to be the next node of the current cursor node, and update the left node pointer of the updated current cursor node to point to the node to be updated.

19. The device according to claim 16, wherein if the update type is a deleting data type, and the type of the current cursor node is the first leaf node, then the processor is further caused to:

update a right node pointer of a previous node of the current cursor node to point to the current cursor node, update a left node pointer of the current cursor node to point to the previous node of the current cursor node, update the current cursor node to be the previous node of the current cursor node, and update a right node pointer of a previous node of the node to be updated to point to the updated current cursor node.

20. A non-transitory computer-readable storage medium, wherein the computer-readable storage medium stores computer-executable instructions, and when a processor executes the computer-executable instructions, the method according to claim 1 is implemented.

\* \* \* \* \*